(12) United States Patent
Motil

(10) Patent No.: US 11,775,657 B2
(45) Date of Patent: Oct. 3, 2023

(54) SYSTEMS AND METHODS FOR ENHANCING SECURITY OF DEVICE-INTERNAL ENCRYPTION WITH EXTERNALLY GENERATED ENTROPY

(71) Applicant: MICROSOFT TECHNOLOGY LICENSING, LLC, Redmond, WA (US)

(72) Inventor: Kirill Motil, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 135 days.

(21) Appl. No.: 17/071,993

(22) Filed: Oct. 15, 2020

(65) Prior Publication Data

US 2022/0121755 A1 Apr. 21, 2022

(51) Int. Cl.
G06F 21/60 (2013.01)
G06F 9/54 (2006.01)
G06F 21/72 (2013.01)
H04L 9/08 (2006.01)

(52) U.S. Cl.
CPC ............ *G06F 21/602* (2013.01); *G06F 9/54* (2013.01); *G06F 21/72* (2013.01); *H04L 9/0869* (2013.01)

(58) Field of Classification Search
CPC .......... G06F 21/602; G06F 9/54; G06F 21/72; G06F 21/79; H04L 9/0869
USPC ....................................................... 713/193
See application file for complete search history.

(56) References Cited

U.S. PATENT DOCUMENTS

| | | | |
|---|---|---|---|
| 2006/0072747 A1* | 4/2006 | Wood | H04L 9/0662 380/44 |
| 2012/0036364 A1* | 2/2012 | Yoneda | H04L 9/006 713/175 |
| 2013/0124591 A1 | 5/2013 | Buch et al. | |
| 2015/0332261 A1* | 11/2015 | Park | G06Q 20/401 705/75 |
| 2019/0075095 A1* | 3/2019 | Venable | H04L 63/1433 |

(Continued)

OTHER PUBLICATIONS

Alendal, et al., ("got HW crypto? On the (in)security of a Self-Encrypting Drive series", Sep. 28, 2015, pp. 1-36). (Year: 2015).*

(Continued)

*Primary Examiner* — Bryan F Wright
(74) *Attorney, Agent, or Firm* — Newport IP, LLC; Jacob P. Rohwer

(57) ABSTRACT

Enhancing security achieved via encryption that is performed within an encryption device by combining entropy that is generated within the encryption device with additional entropy, that is generated external to the encryption device, into the generation of an encryption key. Prior to an encryption device utilizing a deterministic algorithm to generate the encryption key, multiple random numbers may be obtained from different entropy sources—at least one of which is internal to the encryption device and at least one of which is external to the encryption device. The encryption device combines the multiple random numbers into a combined entropy input that cannot be determined from either one of the random numbers alone. This combined entropy input is then utilized to generate the encryption key that is ultimately used to perform the device-internal encryption.

13 Claims, 6 Drawing Sheets

(56) References Cited

U.S. PATENT DOCUMENTS

2019/0342092 A1* 11/2019 Handschuh ........... H04L 9/0816

OTHER PUBLICATIONS

Alendal, et al., "got HW crypto? On the (in)security of a Self-Encrypting Drive series", In Journal of International Association for Cryptologic Research, Oct. 15, 2015, pp. 1-36.
"International Search Report and Written Opinion Issued in PCT Application No. PCT/US2021/041959", dated Mar. 1, 2022, 13 Pages.

* cited by examiner

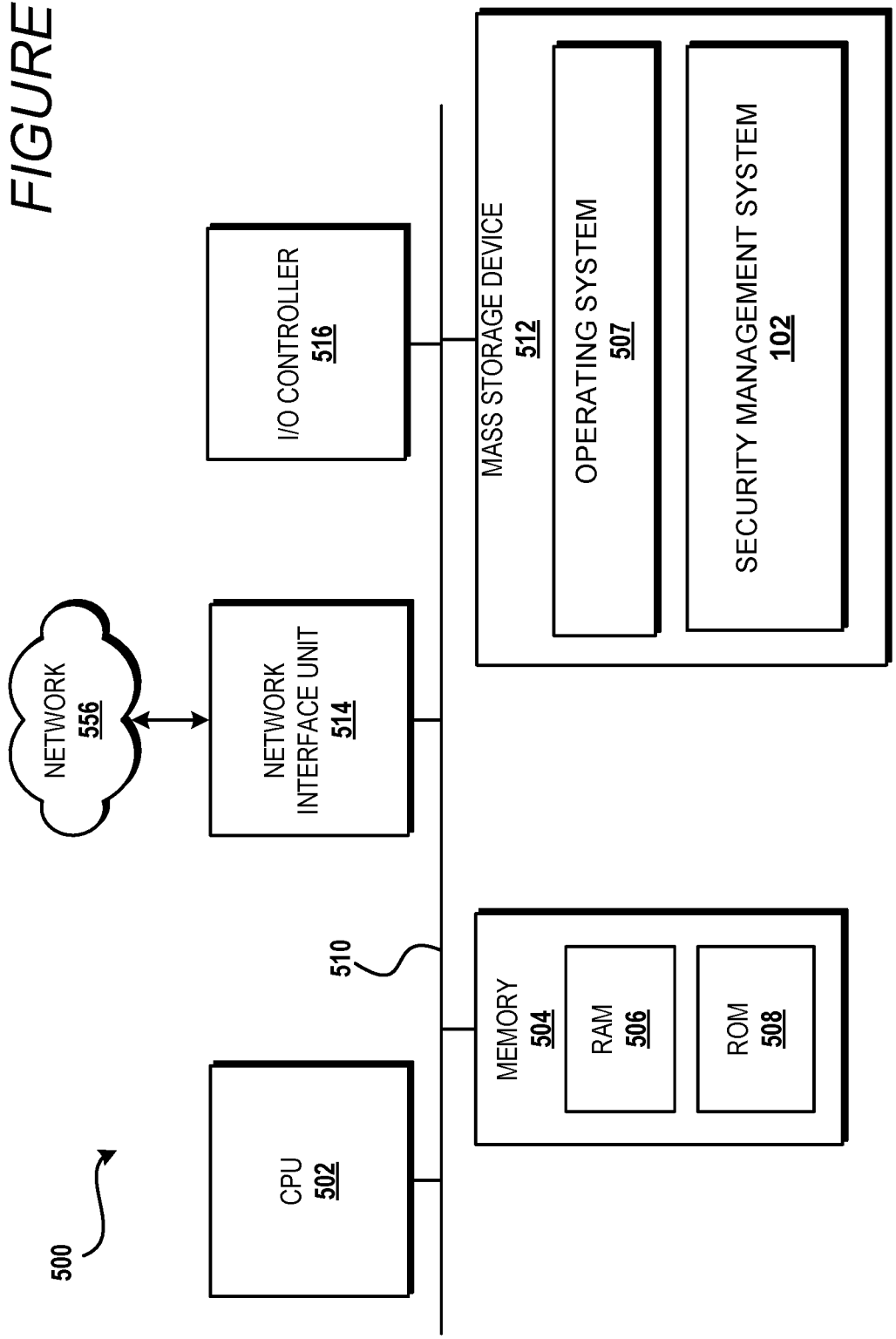

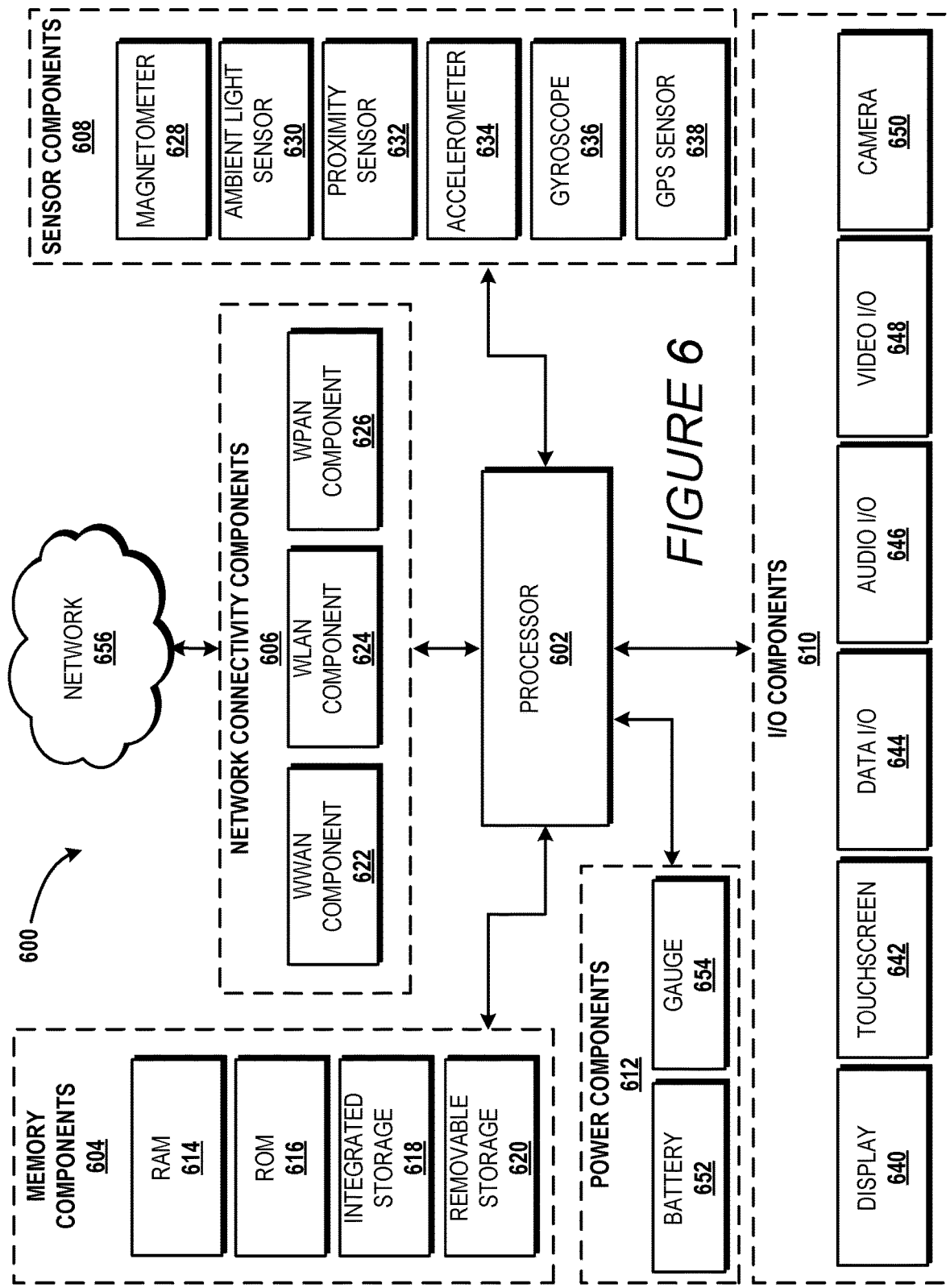

SYSTEMS AND METHODS FOR ENHANCING SECURITY OF DEVICE-INTERNAL ENCRYPTION WITH EXTERNALLY GENERATED ENTROPY

BACKGROUND

Self-Encrypting Drives (SEDs) perform device-internal encryption in which clear text data that is provided directly to a SED is automatically and internally encrypted with an encryption key (e.g., random symmetric key). After encrypting the clear text data, the SED then writes the encrypted data to a storage medium and protects the encryption key with a user credential (e.g., a password, biometric signature, etc.). Notably, in this technique the user credential is serving as protection to the encryption key rather than the encrypted data that is written to the storage medium. One advantages of this technique is that the user credential can be periodically changed without any necessity of re-encrypting the encrypted data that is already written to the storage medium. Another advantage of this technique is that the encrypted data that is written to the storage medium can be practically destroyed by simply deleting the encryption key.

However, if a malicious entity (e.g., a hacker) is somehow able to reproduce the encryption key, then this malicious entity can readily unencrypt the encrypted data that is stored on the SED without any dependence on the user credential. For example, if the encryption key itself is compromised, then a user can change his or her password (and in doing so likely gain a false sense of security) without producing any effect on whether the encrypted data is protected. Since encryption key generation techniques can be deterministic (i.e., hashing the same input will always output the same encryption key), without a good way to validate randomness, one manner in which an encryption key can be reproduced is by guessing the input that was used to generate the encryption key. To illustrate this point, if the encryption key is generated via a deterministic algorithm by hashing the current date plus a counter of the number of keys generated on that current date (e.g., to prevent generation of duplicate or identical keys), then a hacker can reproduce the encryption key simply by guessing the date on which the encryption key was generated (e.g., often simply the first date a computing device was used).

For this reason, encryption keys are typically generated by utilizing a deterministic algorithm to generate an encryption key based on some random number that is provided upon request from a random number generator (RNG) within a computing device. For example, a SED may include an embedded RNG chip from which a random number is obtained and used to generate an encryption key. However, since it is extremely difficult to determine if a generated number is truly random or merely pseudo random, it is impractical to discern whether the actual source of a purported randomly generated number has itself been compromised. For example, if the RNG chip within the SED has poor entropy due to producing seemingly random numbers based on some limited range of real-world environmental variables (e.g., fluctuations in temperature, electrical signals, fan noise, etc.) which can be guessed, then a malicious entity can reliably and repeatedly reproduce encryption keys that are seemingly protecting encrypted data.

It is with respect to these considerations and others that the disclosure made herein is presented.

SUMMARY

The techniques disclosed herein enable computing systems to enhance a level of security that is achieved through device-internal encryption by incorporating externally generated entropy into an encryption key that is used to perform the device-internal encryption. In particular, rather than relying exclusively on a single device-internal entropy source to obtain inputs for generating an encryption key, an encryption key may be generated based on a combination of inputs that are obtained from both device-internal and device-external entropy sources. For example, prior to an encryption device (e.g., a Self-Encrypting Drive) utilizing a deterministic algorithm to generate an encryption key, multiple random numbers may be obtained from different entropy sources—at least one of which is internal to the encryption device and at least one of which is external to the encryption device. An exemplary device-internal entropy source may be a random number generator (RNG) chip that is embedded within the encryption device. An exemplary device-external entropy source may be a software-based RNG that is executed by a host operating system (OS) running on a client device within which the encryption device is installed. Upon receiving the multiple numbers (and still prior to generating the encryption key), the encryption device may combine the multiple random numbers into a combined entropy input that cannot be determined from either one of the random numbers alone. That is, even if either one of the internally sourced or externally sourced numbers become compromised the combined entropy input will remain unknown. This combined entropy input that is a combination of both the internally and externally sourced entropy is then utilized to generate the encryption key that is ultimately used to perform the device-internal encryption.

In this way, these techniques significantly reduce the probability of a malicious entity successfully reproducing encryption keys that are generated by way of a deterministic algorithm before being utilized to protect encrypted data produced by way of device-internal encryption. For example, presuming that a malicious entity is somehow able to reliably discern one of the multiple numbers that are used to generate the combined entropy input (to the deterministic algorithm), this malicious entity will still be unable to reproduce the encryption key. This is true even when the encryption key is generated by way of some industry-known deterministic algorithm because the combined entropy input to the algorithm remains unknown despite one of the random numbers being compromised. To illustrate this point, presume that a SED includes an internal RNG chip for the purpose of providing random numbers for generating encryption keys. Further presume that a malicious entity has somehow compromised this internal entropy source (e.g., by predicting the outputs of the RNG chip due to poor or weak entropy having only a limited number of probable output values). Here, if a single number provided by this internal entropy source were to be used as a direct and singular input into a deterministic algorithm to generate encryption keys, the malicious entity would be able to reliable reproduce these encryption keys at will. However, since the techniques described herein instead involve combining a first number provided by the internal entropy source with a second number provided by an external entropy source to produce a combined entropy input that cannot be discerned from either number alone, the malicious entity will still be unable to reproduce the encryption key since the second number provided from the external entropy source remains unknown to the malicious entity.

In an exemplary embodiment, a client computing system such as a laptop computer includes a Self-Encrypting Drive (SED) that is configured to automatically and internally encrypt clear text data as it is provided directly to the SED from a host operating system (OS) running on the client computing system. For example, the host OS may be facilitating operation of a text processing application via which a user is creating sensitive data that is to be stored on the SED. Once encrypted and stored on a storage medium of the SED, this encrypted data may be access restricted based on some user-credential that can be provided to unlock (e.g., access) an encryption key that is stored internally on the SED (and that was used to encrypt the clear text data into the encrypted data).

In this exemplary embodiment, an encryption controller may be embedded internally within the SED and may conduct a sequence of operations to perform device-internal encryption (i.e., encryption that is performed within an encryption device such as the SED). In some implementations, this sequence of operations begins with receiving a first number from a first entropy source and a second number from a second entropy source. The first number may be an N-bit random number that is sourced from a drive entropy source (e.g., a RNG chip) that is internally installed within the SED. As used herein, the letter N represents any suitable positive integer for representing a possible number of bits of security strength (e.g., 128, 256, etc.). The second number may be a random number (which may be another N-bit number) that is sourced from a host entropy source that is external to the SED (i.e., not installed within the SED). In some embodiments, in order to provide the second number from the host entropy source to the SED, one or more drivers associated with the SED may issue an application programming interface (API) call directly to the SED and this API call may include the instance of externally generated entropy that is generated by the host entropy source that is external to the SED. For example, the SED driver may issue an API call to an API of the host OS that exposes a software based RNG. As another example, the API call that is issued to the SED may include a random number that is generated by a RNG chip that is integrated within a processor that is installed within the client computing system.

Once both of the "internally sourced" first number and the "externally sourced" second number are received, the encryption controller may advance the sequence to an operation of generating a combination of the first number and the second number. For example, the encryption controller may utilize each of the first number and the second number as inputs to an additive cipher that outputs the combination thereof. An exemplary additive cipher is the XOR cipher (as known within the cryptography industry) which applies the exclusive disjunction (XOR) operation to a predefined set of principles. In some embodiments, each of the first number and the second number are N-bit numbers (e.g., a 256-bit random) and the final output that is the combination of the first number and second number is also an N-bit number (e.g., a 256-bit random). In this way, even if a single one of the two numbers somehow becomes compromised (e.g., a hacker discerns one but not both of these numbers), the remaining encryption level of the combined entropy input will retain the same bit number as each of the two random numbers have individually.

This newly generated combination the first number and the second number may then serve as a combined entropy input to a suitable algorithm for generating an encryption key. For example, a cryptographic hash function may be applied to the combined entropy input to generate the encryption key. Stated alternatively, the cryptographic hash function is used to hash the combined entropy input into the encryption key. Exemplary cryptographic hash functions include, but are not limited to, various Secure Hash Algorithms (SHAs) such as SHA-256 and various Key Derivation functions such as PBKDF2.

Once the encryption key is generated at the encryption controller, clear text data is then provided to the SED directly from the host OS. As the clear text data is received at the SED, the encryption controller utilizes the encryption key to convert the clear text data into encrypted data that is then written to a storage medium that is internal to the SED. In this exemplary embodiment, even if a malicious entity successfully determines either one of the multiple different numbers utilized to generate the combined entropy input that is ultimately hashed into the encryption key, the encryption key retains a security level commensurate with the byte level of whichever number has not been compromised. For example, even if a hacker can determine the "internally sourced" first number, the encryption key retains the security level of the "externally sourced" second number which remains uncompromised. Accordingly, implementing the techniques described herein drastically increases the difficulty of successfully reproducing the encryption key used to protect the encrypted data since a malicious entity would need to compromise each individual entropy source (e.g., random numbers) used to generate the combined entropy input that is ultimately utilized for generation of the encryption key.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items.

References made to individual items of a plurality of items can use a reference number followed by a parenthetical containing a number of a sequence of numbers to refer to each individual item. Generic references to the items may use the specific reference number without the sequence of numbers. For example, the items may be collectively referred to with the specific reference number preceding a corresponding parenthetical containing a sequence number.

FIG. 5 is a computer architecture diagram illustrating an illustrative computer hardware and software architecture for a computing system capable of implementing aspects of the techniques and technologies presented herein.

FIG. 6 is a computer architecture diagram illustrating a computing device architecture for a computing device capable of implementing aspects of the techniques and technologies presented herein.

DETAILED DESCRIPTION

The following Detailed Description discloses technologies that enhance security achieved via encryption that is performed within an encryption device by combining entropy that is generated within the encryption device with additional entropy, that is generated external to the encryption device, into the generation of an encryption key. Generally described, prior to an encryption device (e.g., a Self-Encrypting Drive) utilizing a deterministic algorithm to generate the encryption key (e.g., a random symmetric key), multiple random numbers may be obtained from different entropy sources—at least one of which is internal to the encryption device and at least one of which is external to the encryption device. Then, upon receiving the multiple numbers, the encryption device may combine the multiple random numbers into a combined entropy input that cannot be determined from either one of the random numbers alone. That is, even if either one of the internally sourced or externally sourced numbers become compromised, the combined entropy input will remain practically indiscernible due to the entropy from the uncompromised source. This combined entropy input is then utilized to generate the encryption key that is ultimately used to perform the device-internal encryption. In this way, these techniques significantly reduce the probability of a malicious entity successfully reproducing the deterministically generated encryption key because any one of the entropy sources may become compromised without eliminating the integrity of the encryption key.

Various examples, scenarios, and aspects of the disclosed techniques are described below with reference to FIGS. 1-6.

Figure 1:
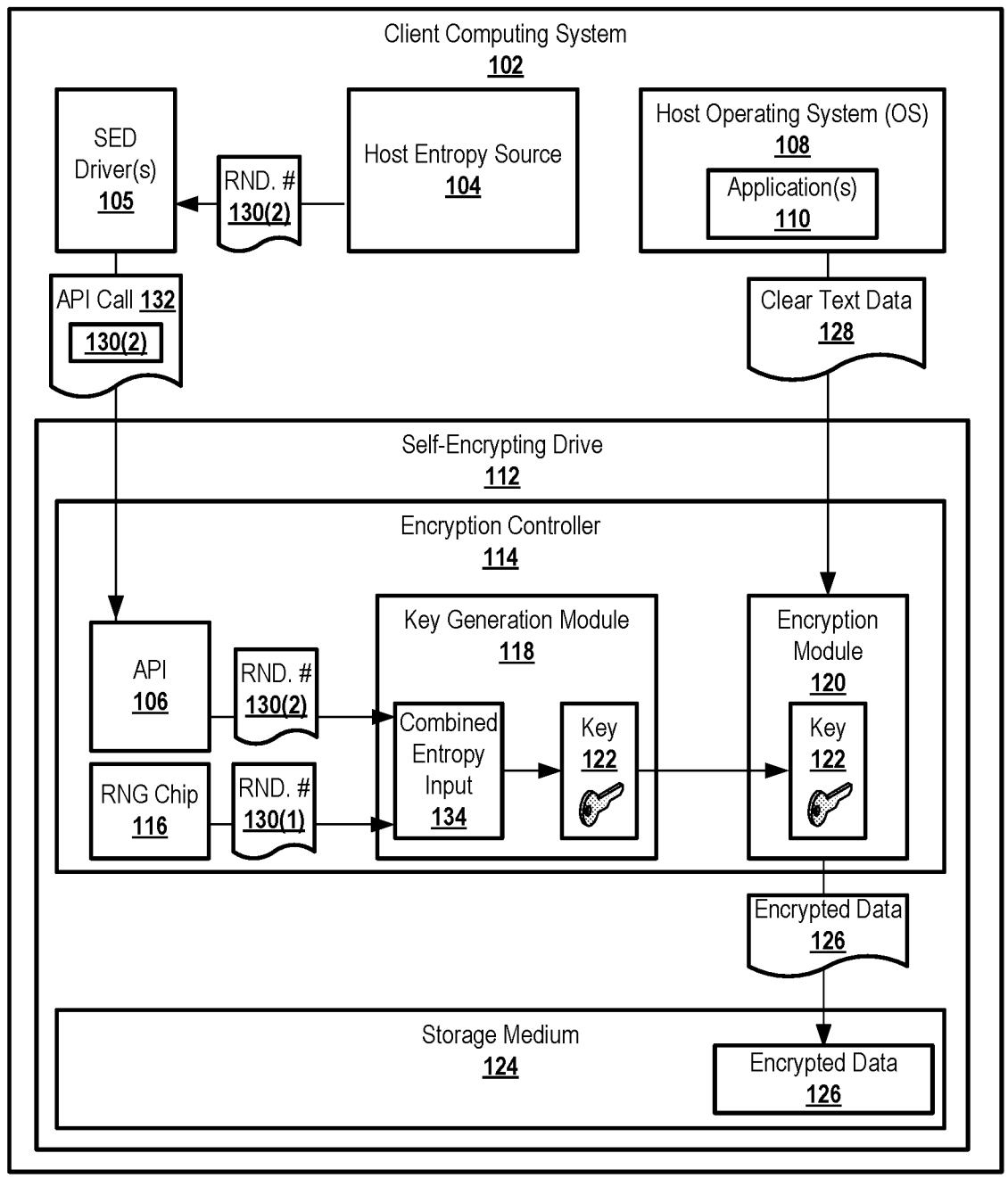
FIG. 1 illustrates an example environment in which a client computing system is equipped with a Self-Encrypting Drive (SED) that generates an encryption key based on a combination of entropy that is generated internally within the SED and entropy that is generated externally from the SED.

FIG. 1 illustrates an example environment 100 in which a client computing system 102 is equipped with a Self-Encrypting Drive (SED) 112 that generates an encryption key 122 based on a combination of entropy that is generated internally within the SED 112 and entropy that is generated externally from the SED 112. The client computing system 102 may be, for example, a laptop computer, a desktop computer, a tablet computer, a smartphone computer, a videogaming console, or any type of computing system suitable for use in conjunction with a SED 112.

As illustrated, the client computing system 102 has installed therein each of a host entropy source 104, a host operating system (OS) 108, and the SED 112. Although internal to the client computing system 102, the host entropy source 104 is physically external from the SED 112 component of the client computing system 102. In some embodiments, the SED 112 may be a single stand-alone computing component that is sourced from one of many different vendors which supply a multiple of other computing components that are integrated together during a final assembly of the client computing system 102. For example, the SED 112 may be a one-terra byte solid state drive having built in encrypting functionality whereas the host entropy source 104 may be a central processing unit that is supplied by a separate vendor than the SED 112. The SED 112 may be configured to automatically and internally encrypt clear text data 128 (thereby generating encrypted data 126) that is received from the host OS 108 and to then automatically write the encrypted data 126 into a storage medium 124 of the SED 112. Exemplary forms of storage medium 124 include, but are not limited to, electromechanical hard disk drives (HDDs), solid-state drives (SSDs), or any other device or material suitable for placing, keeping, and retrieving electronic data.

In the illustrated embodiment, the host OS 108 is shown to be facilitating operation of one or more applications 110 through which the clear text data 128 is generated. For example, the application 110 may be a text processing application (e.g., MICROSOFT WORD) via which a user is creating sensitive data in clear text form and, therefore, is to be encrypted by the SED 112 prior to being written to the storage medium 124. Once encrypted and stored on the storage medium 124 of the SED 112, the encrypted data 126 may be access restricted based on some user-credential. The client computing system 102 may require that the user-credential is provided to authenticate the user as a condition-precedent to unlocking the nominal space of the SED 112—the nominal space including the storage medium 124 on which the encrypted data 126 is stored. As described above, upon successful user-authentication based on the user credential, access is provided to the encryption key 122 that was used to generate the encrypted data 126, thereby enabling the encrypted data 126 to be unencrypted (e.g., converted back into clear text form). Stated more plainly, the user credential is serving as protection to the encryption key 122 rather than the encrypted data 126 that is written to the storage medium 124. For this reason, an objective of the techniques disclosed herein is to increase the difficulty associated with successfully reproducing encryption keys 122 that are generated by way of a deterministic algorithm and then utilized to protect encrypted data 126 produced by way of device-internal encryption.

In order to achieve this objective, an encryption controller 114 may perform a sequence of operations to combine entropy that is generated within the SED 112 with additional entropy that is generated external to the SED 112 into the generation of the encryption key 122. As illustrated, the sequence of operations may include receiving at a key generation module 118 a first random number 130(1) from a random number generator (RNG) chip 116 that is installed within the SED 112. The RNG chip 116 may aptly be described as a "drive entropy source" due to being an integral component of the SED 112. In various implementations, the random number 130(1) is an N-bit random number that is generated internally within the SED 112 on-demand by the RNG chip 116. The RNG chip 116 may be a hardware random number generator (HRNG) (also referred to herein as a true random number generator (TRNG)) that generates random numbers based on physical processes rather than by means of an algorithm. Exemplary such physical processes include microscopic and/or quantum phenomena that produce statistically random noise signals.

The sequence of operations may further include the SED 112 (or the key generation module 118 thereof) receiving, by way of an API 106 that is provided by the SED 112, an application programing interface (API) call 132 from a SED driver 105. The API 106 is provided by the SED 112 for use by the SED Driver(s) 105 and/or the host OS 108 as a means of/channel for providing instances of externally generated entropy to the SED 112 and further instructing the SED 112 to incorporate those instances of externally generated entropy into the generation of the encryption key 122. As illustrated, the API call 132 includes a second random number 130(2) that is obtained by the SED driver 105 by way of an API 106 associated with the host entropy source 104. The API call 132 may be issued to the SED 112 (or the key generation module 118 thereof) and may serve as an instruction to use the externally supplied entropy (e.g., the second random number 130(2)) during generation of the encryption key 122. The host entropy source 104 may be, for example, a TRNG chip that is installed within a central processing unit (CPU) of the client computing system 102. As another example, the host entropy source 104 may be a software or algorithm-based pseudo random number generator (PRNG) that is implemented by the host OS 108. In any case, the host entropy source 104 is physically and/or logically external from the SED 112. Thus, even if some malicious entity obtains the ability to determine the first random number 130(1) (e.g., by guessing the first random number 130(1) due to the RNG chip 116 being a poor or weak entropy source), the second random number 130(2) will remain uncompromised.

As described above, in some implementations, each of the first number 130(1) and the second number 130(2) are N-bit random numbers. For purposes of the present discussion, the letter N represents any suitable positive integer for representing a possible number of bits of security strength (e.g., 128, 256, etc.).

The encryption controller 114 may then advance the sequence to an operation of combining the first random number 130(1) and the second random number 130(2) to generate a combined entropy input 134. For example, the key generation module 118 may utilize an additive cipher to combine the internally generated entropy of the first random number 130(1) with the externally generated entropy of the second random number 130(2), thereby generating the combined entropy input 134. An exemplary additive cipher is the XOR cipher (as known within the cryptography industry) which applies the exclusive disjunction (XOR) operation to a predefined set of principles. In some implementations, the combined entropy input 134 may have a bit level that is equal to each of the first random number 130(1) and the second random number 130(2) have individually. As a specific but non-limiting example, suppose that each of the first random number 130(1) and the second random number 130(2) are 256-bit random numbers that are generated on demand by the RNG chip 116 and the host entropy source 104, respectively. Continuing with this example, suppose that the additive XOR cipher is applied to combine the first random number 130(1) and the second random number 130(2) into a 256-bit random number that is both: (1) different than each of the first random number 130(1) and the second random number 130(2), and (2) indiscernible from either single one of the first random number 130(1) and the second random number 130(2) alone. In this way, even if a single one of the first random number 130(1) or the second random number 130(2) is somehow compromised (e.g., a hacker discerns one but not both of these numbers), the remaining encryption level of the combined entropy input 134 will retain the 256-bit level of encryption.

Upon combining the first random number 130(1) with the second random number 130(2) to generate the combined entropy input 134, the encryption controller 114 advances the sequence to an operation of generating the encryption key 122 using the combined entropy input 134 as an input into a suitable cryptographic algorithm. For example, a cryptographic hash function may be applied to the combined entropy input to generate the encryption key. Stated alternatively, the cryptographic hash function is used to hash the combined entropy input into the encryption key. Exemplary cryptographic hash functions include, but are not limited to, various Secure Hash Algorithms (SHAs) such as SHA-256 and various Key derivation algorithms such as BPKDF2.

As illustrated, the key generation module 118 then provides the encryption key 122 to encryption module 120 that is configured to utilize the encryption key 122 to convert the clear text data 128 into the encrypted data 126 that is ultimately written to and subsequently accessed from the storage medium 124. As described above, even if a hacker successfully determines either one of the multiple different random numbers 130 utilized to generate the combined entropy input 134 that is ultimately hashed into the encryption key 122, the encryption key 122 retains a security level commensurate with the byte level of whichever random number(s) 130 has not been compromised. For example, even if a hacker can determine the "internally sourced" first random number 130(1), the encryption key 122 retains the security level of the "externally sourced" second random number 130(2) which remains uncompromised. Accordingly, these techniques significantly reduce the probability of a malicious entity successfully reproducing the encryption key 122 because doing so would require compromising both of the RNG chip 116 (that is installed within the SED 112) and the host entropy source 104 (that is logically external from the SED 112) and furthermore correctly guessing the specific additive cipher used to combine the first and second random numbers 130 into the combined entropy input 134.

In some embodiments, the transmission of the API call to the host entropy source is an operation that is specifically associated with an initialization protocol of the SED 112. For example, it will be appreciated that in some instances, a SED 112 may be configured to generate an encryption key as a part of an initialization process or protocol that occurs upon the first use of the SED 112 within a client computing system 102. Thus, in the context of the techniques disclosed herein, an exemplary initialization protocol may include operations of: receiving an indication of a trigger event associated with the initialization protocol (e.g., a first use of the SED 112 within the client computing system 102, a user request to reformat and/or reinitialize the SED 112, etc.), responsive to the trigger event, obtain the first ransom number 130(1) and the second random number 130(2), generate the combined entropy input 134 from the first ransom number 130(1) and the second random number 130(2), generate the encryption key 122 from the combined entropy input 134, and provide the encryption key 122 to the encryption module 120.

Figure 2:
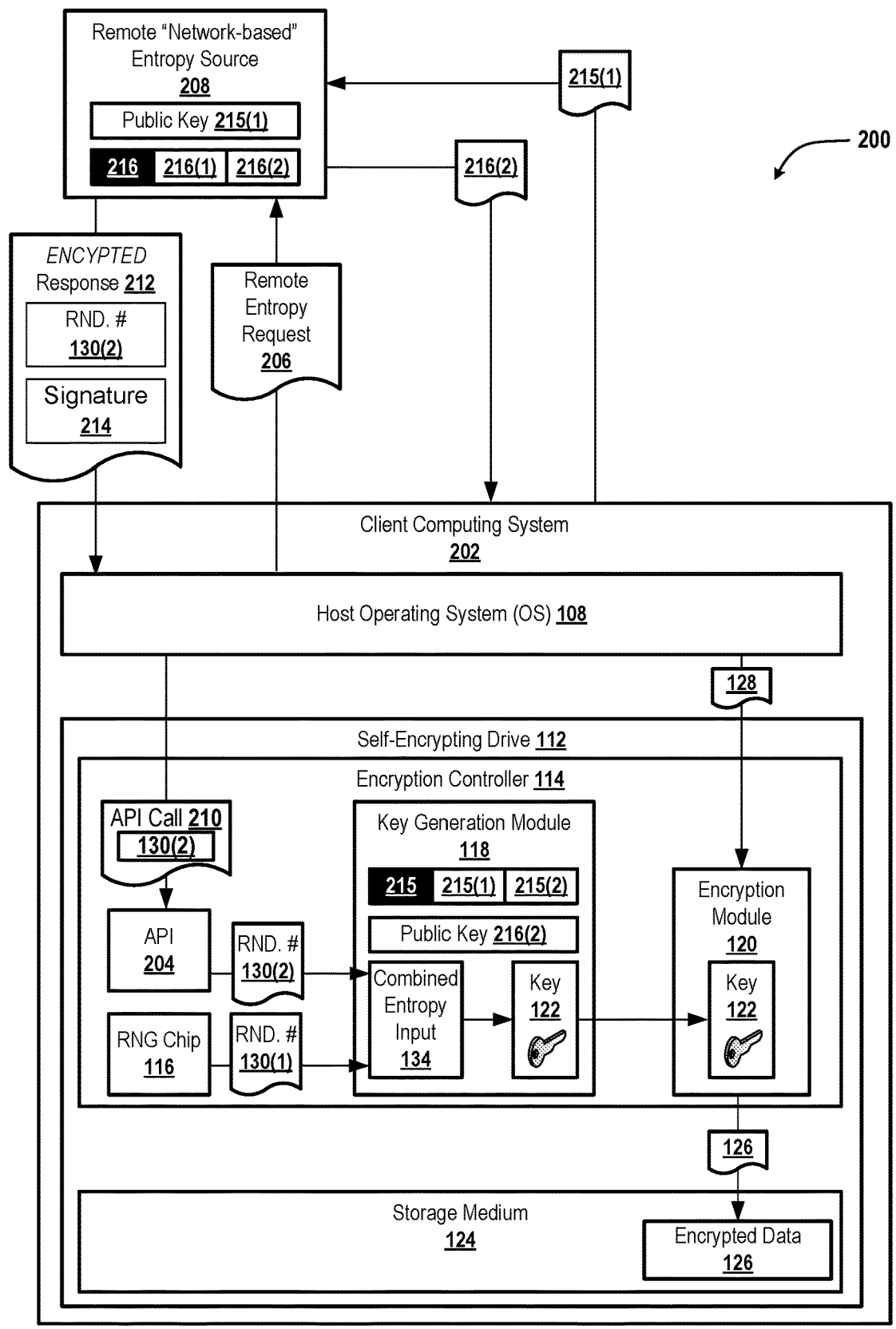
FIG. 2 illustrates an example environment in which a client computing system is configured to generate an encryption key based on a combination of entropy that is generated locally within the client computing system and entropy that is generated remotely outside of the client computing system.

FIG. 2 illustrates an example environment 200 in which a client computing system 202 is configured to generate an encryption key 122 based on a combination of entropy that is generated locally within the client computing system 202 and entropy that is generated remotely from (e.g., outside of) the client computing system 202. In the illustrated embodiment, the client computing system 202 is shown to generate the encryption key 122 based on a combined entropy input 134 that is generated by combining a first random number 130(1) that is generated locally within the client computing system 202 and a second random number 130(2) that is generated externally from (i.e., remotely from/outside of) the client computing system 202 (and transmitted to the client computing system 202 via a network). Here, once the multiple random numbers have been received by the key generation module 118, generation of the combined entropy input 134 described in relation to FIG. 2 is achieved in a similar manner to that described in relation to FIG. 1. For example, the key generation module 118 may utilize an additive cipher (e.g., the XOR cipher) to combine the locally generated entropy of the first random number 130(1) with the remotely generated entropy of the second random number 130(2), thereby generating the combined entropy input 134.

As illustrated, the client computing system 202 includes an API 204 that is configured to facilitate transmission of a remote entropy request 206 from the client computing system 202 to a remote entropy source 208. The transmission of the remote entropy request 206 to the remote entropy source 208 may be triggered by an initialization protocol associated with the SED 112. For example, the host OS 108 may generate the remote entropy request 206 while formatting the SED 112 prior to a first use thereof.

In response to the remote entropy request 206, the remote entropy source 208 transmits a response 212 back to the client computing system 202. The response 212 includes some form of remotely generated entropy. For example, in the illustrated embodiment, the response 212 includes the second random number 130(2) that will ultimately be used by the encryption controller 112 to generate the combined entropy input 134—which in turn may ultimately be used to generate the encryption key 122 via a suitable deterministic algorithm. Then, upon the second random number 130(2) being received at the client computing system 202, an API call 210 is issued from the host OS 108 (and/or a SED driver 105 as shown in FIG. 1) to an API 204 that is provided by the SED 112.

In some embodiments, the requested entropy that is provided to the encryption controller 114 of the client computing system 202 is included within the response 212 in an encrypted form. As illustrated, for example, the second random number 130(2) is shown to be encrypted within the response 212. In particular, the response that includes the second random number 130(2) may be scrambled with a public encryption key 215(1) (that is different than the encryption key 122) into "cipher text" that is unreadable by parties lacking access to a private encryption key 215(2). This helps to protect the confidentiality of the second random number 130(2) while it is being transmitted in the response 212 from the remote entropy source 208 over one or more networks to the client computing system 202. An exemplary process for providing the public encryption key 215(1) to the remote entropy source 208 includes causing the host OS 108 to instruct (e.g., issue a request to) the encryption controller 114 to generate an asymmetric key pair 215 (which includes both of the public encryption key 215(1) and a private encryption key 215(2)). Then, the encryption controller 114 provides the public encryption key 215(1) to the host OS 108 which then transmits the public encryption key 215(1) to the remote entropy source 208. The private encryption key 215(2) may be "private" in the sense that it does not leave the encryption controller 114. Upon receipt the response 212 at the client computing system 202, the ciphertext is unscrambled based on the secret encryption key so as to reveal the second random number 130(2). It will be appreciated that transmitting the requested entropy from the remote entropy source 208 in an encrypted format will further reduce a probability of a malicious entity success- fully determining the second random number 130(2) in the event that the response 212 is intercepted while being transmitted over the one or more networks from the remote entropy source 208 to the client computing system 202.

Furthermore, in some embodiments, the response 212 may include a signature 214 associated with the remote entropy source 208. The signature 214 serves as a protective measure to prevent the response 212 from being intercepted by a malicious entity and replaced with a "forged" response that purports to be from the remote entropy source 208 but is generated by and transmitted from the malicious entity to fool the encryption controller 114 into utilizing a number (or other form of entropy) that is unknowingly supplied by the malicious entity, rather than the intended remote entropy source 208. For example, the remote entropy source 208 may generate an asymmetric encryption key pair 216 that includes both of a private key 216(1) and a public key 216(2). Then, the remote entropy source may provide the public key 216(2) to the client computing system 202. In the illustrated embodiment, the client computing system 202 then causes the public key 216(2) to be stored on the encryption controller 114.

Upon receiving the response 212, the public key 216(2) that is stored locally on the client computing system 202 may be used to verify the authenticity of the response 212. That is, the public key 216(2) may be utilized to confirm that the response 212 was in fact provided by the remote "network-based" entropy source 208—rather than some message spoofing malicious entity. In the illustrated embodiment, the public key 216(2) is stored within the encryption controller 114 of the SED 112. Thus, it will be appreciated that in some embodiments the encryption controller 114 that is embedded within the SED 112 may perform the message authentication of the response 212 via use of the public key 216(2) and the signature 214.

Upon receiving each of the locally generated first random number 130(1) and the remotely generated second random number 130(2), the encryption controller 114 may then advance the sequence to an operation of combining the first random number 130(1) and the second random number 130(2) to generate a combined entropy input 134. Then, after generating the combined entropy input 134, the encryption controller 114 advances the sequence to an operation of generating the encryption key 122 by hashing the combined entropy input 134 via a suitable cryptographic algorithm. The key generation module 118 then provides the encryption key 122 to encryption module 120 that is configured to utilize the encryption key 122 to convert the clear text data 128 into the encrypted data 126 that is ultimately written to and subsequently accessed from the storage medium 124.

Figure 3:
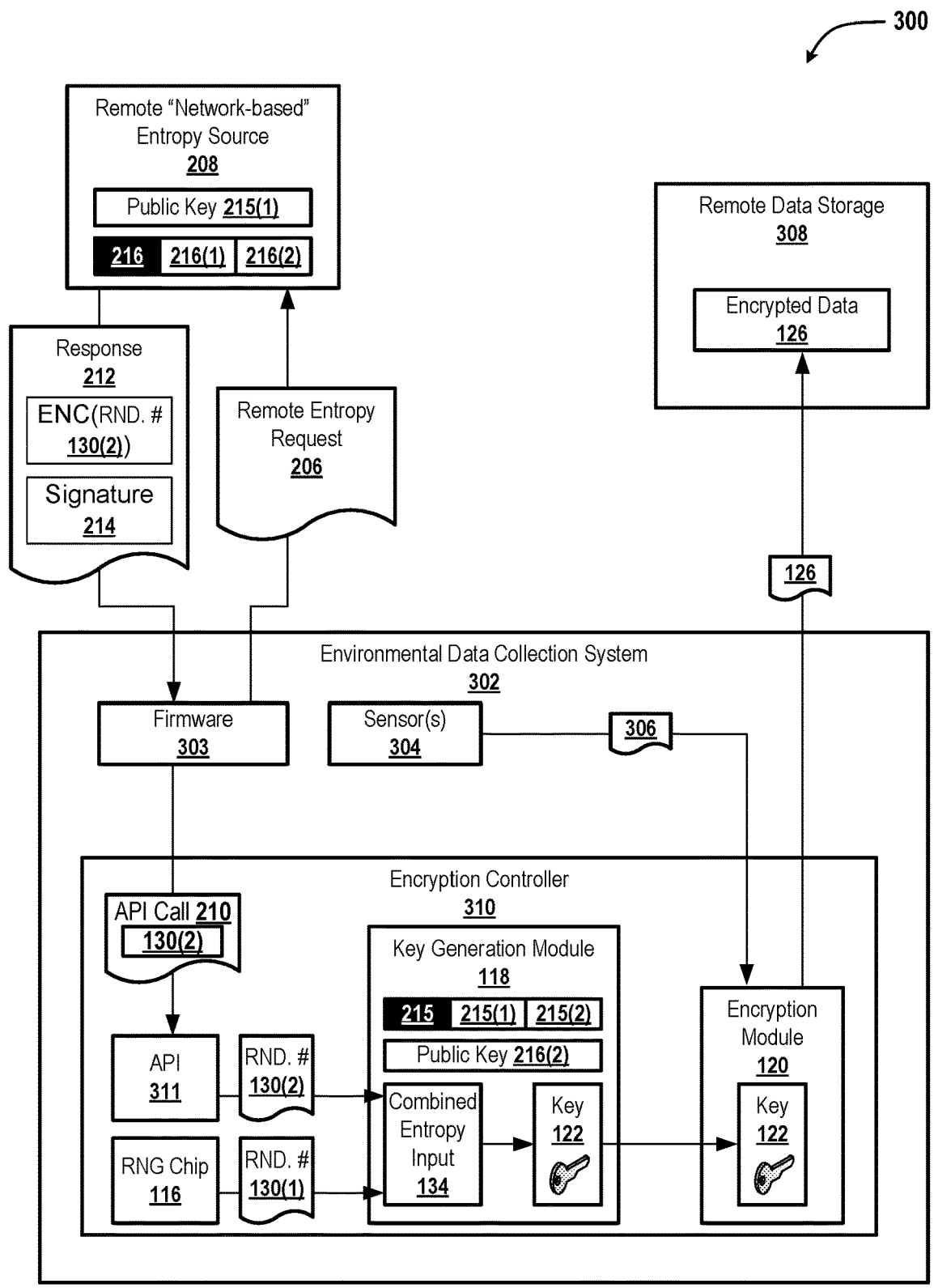
FIG. 3 illustrates an example environment in which an environmental data collection system is configured to encrypt locally collected environmental data using an encryption key that incorporates a combination of locally generated entropy and externally generated entropy.

FIG. 3 illustrates an example environment 300 in which an environmental data collection system 302 is configured to encrypt locally collected environmental data 306 using an encryption key 122 that incorporates a combination of locally generated entropy and externally generated entropy. As illustrated, the environmental data collection system 302 includes one or more sensors 304 that are configured to collect the environmental data 306. An exemplary environmental data collection system 302 may be an Internet-of-Things (I-o-T) type security camera system that is configured with one or more audio and/or video sensors to record audio and/or video of a physical environment within which the environmental data collection system 302 resides. Another exemplary environmental data collection system 302 may be a digital personal productivity assistant device that is configured to continuously listen for a wakeup phrase (e.g., Hey Cortana) and perform various user requested tasks such as setting reminders and answering questions.

As illustrated, the environmental data collection system 302 includes a firmware 303 that is configured to facilitate transmission of a remote entropy request 312 from the environmental data collection system 302 to a remote entropy source 208. As specifically illustrated, the environmental data collection system 302 includes an encryption controller 310 having an RNG chip 116, a key generation module 118, and an encryption module 120. Here, the RNG chip 116 is illustrated to generate the first random number 130(1) and provide the same to the key generation module 118. As further illustrated, the firmware 303 of the environmental data collection system 302 transmits the remote entropy request 206 to the remote entropy source 208.

In a similar manner as that described in relation to FIG. 2, the remote "network-based" entropy source 208 may respond to the remote entropy request 206 with a response 212 that includes externally generated entropy in an encrypted format. For example, the response 212 may include a second random number 130(2) that is in an encrypted format which may be unencrypted by some secret encryption key (that is different than the encryption key 122). Upon receiving the response 212, the firmware 303 transmits the API call 212 to an API 311 that is provide by the encryption controller 310.

Upon receiving each of the locally generated first random number 130(1) and the remotely generated second random number 130(2), the encryption controller 310 may then advance the sequence to an operation of combining the first random number 130(1) and the second random number 130(2) to generate a combined entropy input 134. Then, after generating the combined entropy input 134, the encryption controller 114 advances the sequence to an operation of generating the encryption key 122 by utilizing the combined entropy input 134 via a suitable cryptographic algorithm. The key generation module 118 then provides the encryption key 122 to encryption module 120 that is configured to utilize the encryption key 122 to convert the environmental data 306 into the encrypted data 126. For example, in an embodiment in which the environmental data collection system 302 is an I-o-T type security system, the environmental data 306 may be audio and/or video data that is collected from the physical environment within which the environmental data collection system 302 is operating.

As illustrated, rather than being stored locally (i.e., on a physical storage medium that resides within the environmental data collection system 302), the encrypted data 126 is transmitted from the environmental data collection system 302 to a remote data storage 308. Due to the encrypted data 126 being encrypted by an encryption key 122 that incorporates both remotely generated entropy locally generated entropy, the techniques described in relation to FIG. 3 significantly reduce the probability that a malicious entity (e.g., a computer hacker) will successfully be able to fully discern the entropy used to generate the encryption key 122 and, therefore, gain an ability to reliably reproduce the encryption key 122. Thus, even if unauthorized access to the encrypted data 126 is somehow obtained (e.g., by breaking into the remote data storage 308 and/or intercepting the encrypted data 126 during transmission over one or more networks), converting the encrypted data 126 back into the form of the unencrypted environmental data 306 will remain highly unpractical. As described above, this is because doing so would require a malicious entity to somehow further obtain each of the remotely generated entropy and the locally generated entropy to further determine the specific algorithmic means by which these two different sources of entropy were combined.

Figure 4:
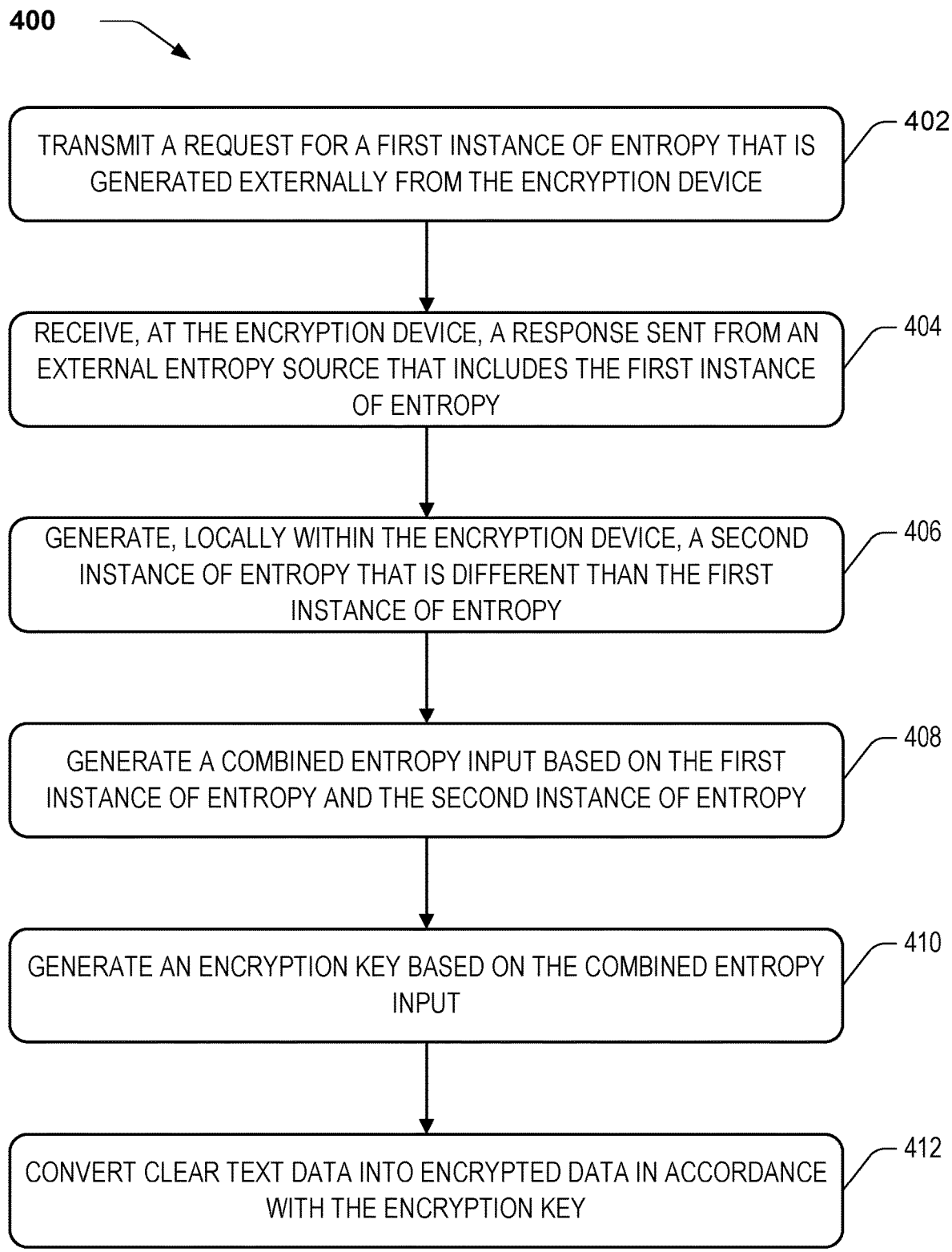
FIG. 4 illustrates an exemplary process of enhancing a security level that is achieved via device-internal encryption by incorporating both internally generated and externally generated entropy into an encryption key used to perform the device-internal encryption.

Turning now to FIG. 4, a process 400 is describe that facilitates enhancing a security level that is achieved via device-internal encryption by incorporating both internally generated and externally generated entropy into an encryption key used to perform the device-internal encryption. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the process 400 may be also implemented in many other ways. For example, the process 400 may be implemented, at least in part, by a processor of another remote computer or a local circuit. In addition, one or more of the operations of the process 400 may alternatively or additionally be implemented, at least in part, by a chipset working alone or in conjunction with other software modules. In the example described below, one or more modules of a computing system can receive and/or process the data disclosed herein.

Any service, circuit or application suitable for providing the techniques disclosed herein can be used in operations described herein.

At operation 402 of the process 400, a remote entropy request is transmitted to some predetermined entropy source that is external to the encryption device. For example, the remote entropy request may be transmitted to a host entropy source such as, for example, a random number generator that is integrated within a central processing unit of the client computing system within which the encryption device is installed. Additionally, or alternatively, remote entropy request may be transmitted from a client computing system to the remote entropy source. Then, responsive to the remote entropy request, the remote entropy source generate an instance of entropy transmitted this externally generated entropy back to the encryption device.

At operation 404 of the process 400, a response that is generated based on the API call and that includes the externally generated entropy is received at the encryption device. In some embodiments, the externally generated entropy is an N-bit random number that is generated by a hardware random number generator that is physically located within the client computing system within which the encryption device is operating.

At operation 406 of the process 400 a second instance of entropy (that is different than the first instance of entropy) is generated locally within the encryption device. In some embodiments, this internally generated entropy is another N-bit random number that is generated by a hardware random number generator that is physically located within a self-encrypting Drive that is installed within the client computing system within which the encryption device is operating.

At operation 408 of the process 400, a combined entropy input is generated based on the first instance of entropy that is generated externally from the encryption device and also the second instance of entropy that is generated internally within the encryption device. For example, as described above, an additive cipher may be applied to combine each of the first randomly generated number and a second randomly generated number together form a combined entropy input. Furthermore, as described above, the combined entropy input may remain indiscernible even in the event that a malicious entity successfully obtains or otherwise determines some but not all of the random numbers (or other forms of entropy) that are utilized to generate the combined entropy input.

At operation 410 of the process 400, an encryption key is generated based upon the combined entropy input. For example, the combined entropy input may be utilized an an input to some predetermined cryptographic function to generate a random encryption key.

Ultimately, at operation 412 of the process 400, the encryption device converts clear text data into encrypted data in accordance with the encryption key that is generated based upon the combined entropy input. In some embodiments, the encrypted data is then written to a storage medium that resides locally on a client computing system on which the encryption device is operating. Additionally, or alternatively, the encrypted data may be transferred to a remote storage location is external from the client computing system in which the encryption device is operating.

The FIG. 5 shows additional details of an example computer architecture 500 for a computer, such as such as a server and/or server cluster, capable of executing the program components described herein. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more applications, such as the analysis module 129. The mass storage device 512 can also store computer-executable instruction for implementing the security management system 102.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit

514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Turning now to FIG. 6, an illustrative computing device architecture 600 for a computing device that is capable of executing various software components described herein for enabling the techniques disclosed herein. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 600 is applicable to any of the computing devices shown in FIG. 1 and FIG. 7. Moreover, aspects of the computing device architecture 600 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 804, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some configurations, the processor 602 is fabricated, in part, utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 and/or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available as a total combined storage capacity. In some configurations, the total combined capacity of the integrated storage 618 and the removable storage 620 is shown to a user instead of separate storage capacities for the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the network 604 of FIG. 6. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 656 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 656 via the WI-FI access points. Such connections may be secured via various encryption technologies including, but not limited, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 632 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems. The GPS sensor 638 can also operate in conjunction with other components, such as the processor 602, to generate positioning data for the computing device 600.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio I/O interface component 646 includes a speaker for the output of audio signals. In some configurations, the audio I/O interface component 646 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via an I/O component.

Example Clauses

The disclosure presented herein may be considered in view of the following clauses.

Example Clause 1. A system for enhancing security of device-internal encryption with externally generated entropy, the system comprising: a host operating system (OS) that is communicatively coupled to a Self-Encrypting Drive, wherein the host OS is configured to transmit data that is generated by an application to the Self-Encrypting Drive; and an encryption controller that is embedded within the Self-Encrypting Drive, wherein the encryption controller is configured to: receive a first number from a drive entropy source this is embedded within the Self-Encrypting Drive, receive a second number from a host entropy source that is external to the Self-Encrypting Drive, generate an encryption key based on a combination of the first number and the second number, encrypt the data, that is generated by the application, into encrypted data in accordance with the encryption key, and write the encrypted data to a storage medium that is embedded within the Self-Encrypting Drive.

Example Clause 2. The system of Example Clause 1, wherein the second number is provided to the encryption controller within an application programing interface (API) call that facilitates an initialization protocol of the Self-Encrypting Drive.

Example Clause 3. The system of Example Clause 1, wherein the encryption controller is further configured to: generate, based upon an additive cipher, the combination of the first number and the second number, and subsequent to generating the combination based upon the additive cipher, apply a cryptographic function to the combination, that is generated based on the additive cypher, to generate the encryption key.

Example Clause 4. The system of Example Clause 1, wherein the drive entropy source is a random number generator (RNG) that is embedded within the Self-Encrypting Drive.

Example Clause 5. The system of Example Clause 4, wherein the RNG that is embedded within the Self-Encrypting Drive is a first RNG, and wherein the host entropy source is a second RNG that is embedded within a central processing unit that is operating to execute the host OS.

Example Clause 6. The system of Example Clause 1, wherein: the first number that is received from the drive entropy source is a first N-bit number, the second number that is received from the host entropy source is a second N-bit number, and the combination of the first number and the second number is a third N-bit number.

Example Clause 7. The system of Example Clause 6, wherein the third N-bit number is generated by application of an additive cipher to the first N-bit number and the second N-bit number within the encryption controller of the Self-Encrypting Drive.

Example Clause 8. A computer-implemented method, comprising: generating, locally within an encryption device, a first random number using a first random number generator that is embedded within the encryption device; receiving, at the encryption device, a second random number that is generated using a second random number generator that is external to the encryption device; generating a combined entropy input by combining the first random number and the second random number via a first algorithm; generating an encryption key by applying a second algorithm to the combined entropy input; and encrypting data into encrypted data in accordance with the encryption key.

Example Clause 9. The computer-implemented method of Example Clause 8, wherein each of the combined entropy input and the encryption key are generated locally within the encryption device.

Example Clause 10. The computer-implemented method of Example Clause 8, further comprising: receiving, from a host OS that is communicatively coupled to the encryption device, an application programming interface (API) call that is addressed to an API that is provided by the encryption device, wherein the API call includes the second random number. Example Clause 11. The computer-implemented method of Example Clause 10, wherein the API call is received at an API that is exposed by a self-encrypting drive to the host OS.

Example Clause 12. The computer-implemented method of Example Clause 11, further comprising: authenticating the response that includes the second random number, that is generated using the second random number generator that is external to the encryption device, based on: a signature that is included within the response, and a public key that is included within the encryption controller, wherein the public key is different than the encryption key.

Example Clause 13. The computer-implemented method of Example Clause 8, wherein the first algorithm is an additive cipher, and wherein the second algorithm is a cryptographic hash function.

Example Clause 14. The computer-implemented method of Example Clause 8, further comprising: writing the encrypted data to a storage medium that is embedded within the encryption device.

Example Clause 15. The computer-implemented method of Example Clause 8, further comprising: transmitting the encrypted data to remote data storage that is external from within the encryption device.

Example Clause 16. The computer-implemented method of Example Clause 8, wherein: the first random number that is generated locally within the encryption device is a first N-bit number, the second random number that is generated externally from the encryption device is a second N-bit number, and the combined entropy input is a third N-bit number.

Example Clause 17. A Self-Encrypting Drive comprising: a storage medium; and an encryption controller that is configured to: receive an application programing interface (API) call that includes an instance of externally generated entropy; generate, locally within the encryption controller, an instance of internally generated entropy; generate an encryption key based on the instance of externally generated entropy and the instance of internally generated entropy; and encrypt data, that is received from a host operating system, into encrypted data in accordance with the encryption key, and write the encrypted data to a storage medium that is embedded within the Self-Encrypting Drive.

Example Clause 18. The Self-Encrypting Drive of Example Clause 17, wherein: the instance of externally generated entropy is a first N-bit random number; and the instance of internally generated entropy is a second N-bit random number.

Example Clause 19. The Self-Encrypting Drive of Example Clause 18, wherein the encryption controller is further configured to: generate a combined entropy input, that is a third N-bit random number, based on the first N-bit random number and the second N-bit random number; and generate the encryption key based on the combined entropy input.

Example Clause 20. The Self-Encrypting Drive of Example Clause 19, wherein the combined entropy input is generated based on an additive cypher, and wherein the encryption key is generated based on a cryptographic hash function.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for enhancing security of device-internal encryption with externally generated entropy, the system comprising:
   a host operating system (OS) that is communicatively coupled to a Self-Encrypting Drive and that is com- munication with a remote network entropy source, the host OS configured to:
      transmit data that is generated by an application to the Self-Encrypting Drive;
      receive, from the remote network entropy source, a public key that is generated as part of an asymmetric key pair by the remote network entropy source;
      provide the public key for storage in the Self-Encrypting Drive;
      receive, from the remote network entropy source, a communication including a first random number and a signature generated using a private key, the private key generated as part of the asymmetric key pair by the remote network entropy source;
      authenticate the communication using the public key stored in the Self-Encrypting Drive; and
      provide the first random number to an encryption controller that is embedded within the Self-Encrypting Drive; and
   the encryption controller configured to:
      receive a second random number from a drive entropy source that is embedded within the Self-Encrypting Drive;
      receive the first random number from the host OS;
      generate an encryption key based on a combination of the first random number and the second random number;
      encrypt the data, that is generated by the application, into encrypted data in accordance with the encryption key; and
      write the encrypted data to a storage medium that is embedded within the Self-Encrypting Drive.

2. The system of claim 1, wherein the first random number is provided to the encryption controller within an application programing interface (API) call that facilitates an initialization protocol of the Self-Encrypting Drive.

3. The system of claim 1, wherein the encryption controller is further configured to:
   generate, based upon an additive cipher, the combination of the first random number and the second random number, and
   subsequent to generating the combination based upon the additive cipher, apply a cryptographic function to the combination, that is generated based on the additive cypher, to generate the encryption key.

4. The system of claim 1, wherein the drive entropy source is a random Number generator (RNG) that is embedded within the Self-Encrypting Drive.

5. The system of claim 1, wherein:
   the first random number is a first N-bit number,
   the second random number is a second N-bit number, and
   the combination of the first random number and the second random number is a third N-bit number.

6. The system of claim 5, wherein the third N-bit number is generated by application of an additive cipher to the first N-bit number and the second N-bit number within the encryption controller of the Self-Encrypting Drive.

7. A computer-implemented method, comprising:
   transmitting, by a host operating system (OS) of a host device and to an encryption device of the host device, data that is generated by an application;
   receiving, by the host OS and from a remote network entropy source, a public key that is generated as part of an asymmetric key pair by the remote network entropy source;
   providing, by the host OS, the public key for storage in the encryption device;
   receiving, by the host OS and from the remote network entropy source, a communication including a first random number generated using a first random generator and a signature generated using a private key, the private key generated as part of the asymmetric key pair by the remote network entropy source;
   authenticating, by the host OS, the communication using the public key stored in the encryption device;
   providing, by the host OS, the first random number to the encryption device;
   generating, locally within the encryption device, a second random number using a second random number generator that is embedded within the encryption device;
   receiving, at the encryption device and from the host OS, the first random number;
   generating a combined entropy input by combining the first random number and the second random number via a first algorithm;
   generating an encryption key by applying a second algorithm to the combined entropy input; and
   encrypting the data in accordance with the encryption key.

8. The computer-implemented method of claim 7, wherein each of the combined entropy input and the encryption key are generated locally within the encryption device.

9. The computer-implemented method of claim 7, further comprising receiving, from the host OS and at the encryption device, an application programming interface (API) call that is addressed to an API that is provided by the encryption device, wherein the API call includes the first random number.

10. The computer-implemented method of claim 7, wherein the first algorithm is an additive cipher, and wherein the second algorithm is a cryptographic hash function.

11. The computer-implemented method of claim 7, further comprising writing the encrypted data to a storage medium that is embedded within the encryption device.

12. The computer-implemented method of claim 7, further comprising transmitting the encrypted data to remote data storage that is external to the encryption device.

13. The computer-implemented method of claim 7, wherein:
> the first random number is a first N-bit number,
> the second random number is a second N-bit number, and
> the combined entropy input is a third N-bit number.

\* \* \* \* \*